United States Patent [19]
Takemoto et al.

[11] Patent Number: 5,534,685
[45] Date of Patent: Jul. 9, 1996

[54] REPEATEDLY USABLE RECORDING MEDIUM CARD AND RECORDING MEDIUM CARD PROCESSOR

[75] Inventors: Takatoshi Takemoto; Kazunari Kawashima; Nobuyuki Muto, all of Tokyo, Japan

[73] Assignee: Kabushiki Kaisha Ace Denken, Tokyo, Japan

[21] Appl. No.: 347,456

[22] PCT Filed: Jun. 2, 1993

[86] PCT No.: PCT/JP93/00741

§ 371 Date: Dec. 5, 1994

§ 102(e) Date: Dec. 5, 1994

[87] PCT Pub. No.: WO93/24901

PCT Pub. Date: Dec. 9, 1993

[30] Foreign Application Priority Data

Jun. 3, 1992 [JP] Japan .................................. 4-142984
Oct. 28, 1992 [JP] Japan .................................. 4-290550

[51] Int. Cl.⁶ .................................................. G06K 19/00
[52] U.S. Cl. ........................... 235/487; 235/380; 235/381; 235/479; 902/23; 283/901
[58] Field of Search .................................. 235/381, 380, 235/494, 479, 487; 902/23; 283/901

[56] References Cited

U.S. PATENT DOCUMENTS

| | | | |
|---|---|---|---|
| 4,349,611 | 9/1982 | Miyakawa et al. | 428/500 |
| 5,085,934 | 2/1992 | Hotta et al. | 428/335 |
| 5,158,924 | 10/1992 | Konagaya et al. | 503/201 |
| 5,298,476 | 3/1994 | Hotta et al. | 503/201 |
| 5,359,183 | 10/1994 | Skodlar | 235/380 X |

FOREIGN PATENT DOCUMENTS

| | | |
|---|---|---|
| 051403 | 5/1982 | European Pat. Off. . |
| 467379 | 1/1992 | European Pat. Off. . |
| 473403 | 3/1992 | European Pat. Off. . |
| 56-90386 | 7/1981 | Japan . |
| 61-105178 | 7/1986 | Japan . |
| 63-211484 | 9/1988 | Japan . |
| 2-50897 | 2/1990 | Japan . |
| 02255172 | 10/1990 | Japan . |
| 3-10393 | 1/1991 | Japan . |
| 3-61086 | 3/1991 | Japan . |
| 04079971 | 3/1992 | Japan . |
| 4-178897 | 6/1992 | Japan . |
| 4-126877 | 11/1992 | Japan . |

*Primary Examiner*—Donald T. Hajec
*Assistant Examiner*—Michael G. Lee
*Attorney, Agent, or Firm*—Lowe, Price, LeBlanc & Becker

[57] ABSTRACT

A recording medium card having a card substrate (20a) made of a flexible material, and a recording portion (21) for visually recording necessary items in a part of the card substrate are disclosed. The recording portion (21) has a reusable indication layer, consisting essentially of an organic compound whose crystal aggregates upon application of heat in a first temperature zone and diffuses upon application of heat in a second temperature zone different from the first temperature zone, on which the necessary items can be visually recorded and erased upon application of heat. An area (24a) is formed in a part of the card substrate, for recording information indicating the number of card use times, equivalent to the number of times data has been recorded and erased on the indication layer.

10 Claims, 7 Drawing Sheets

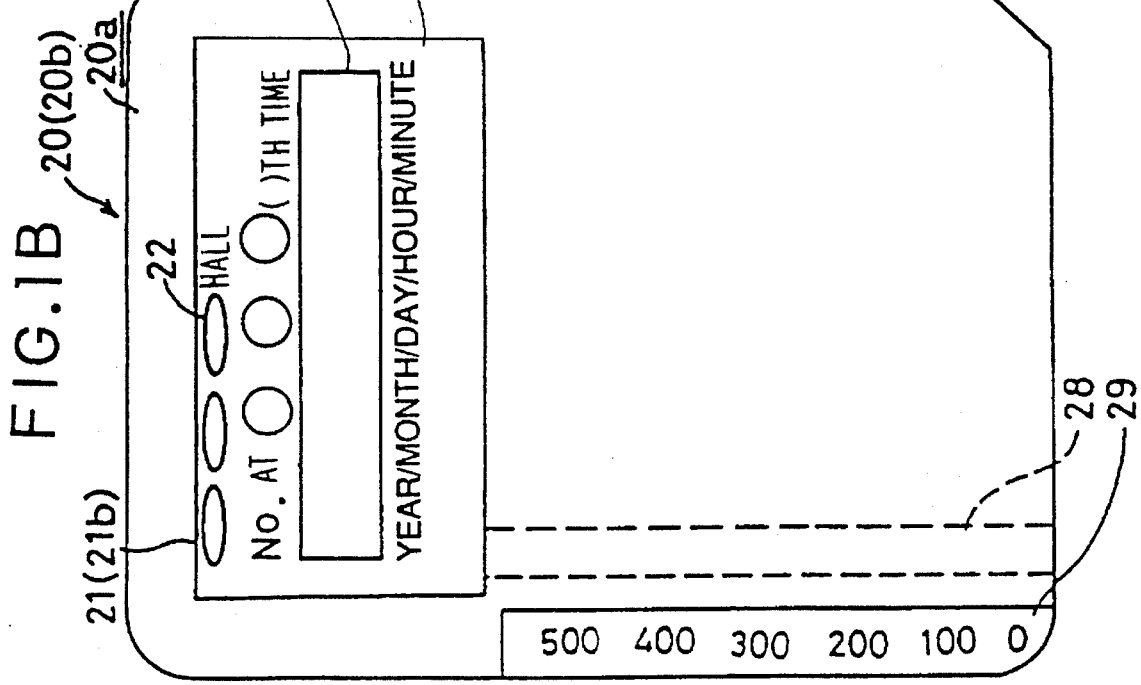
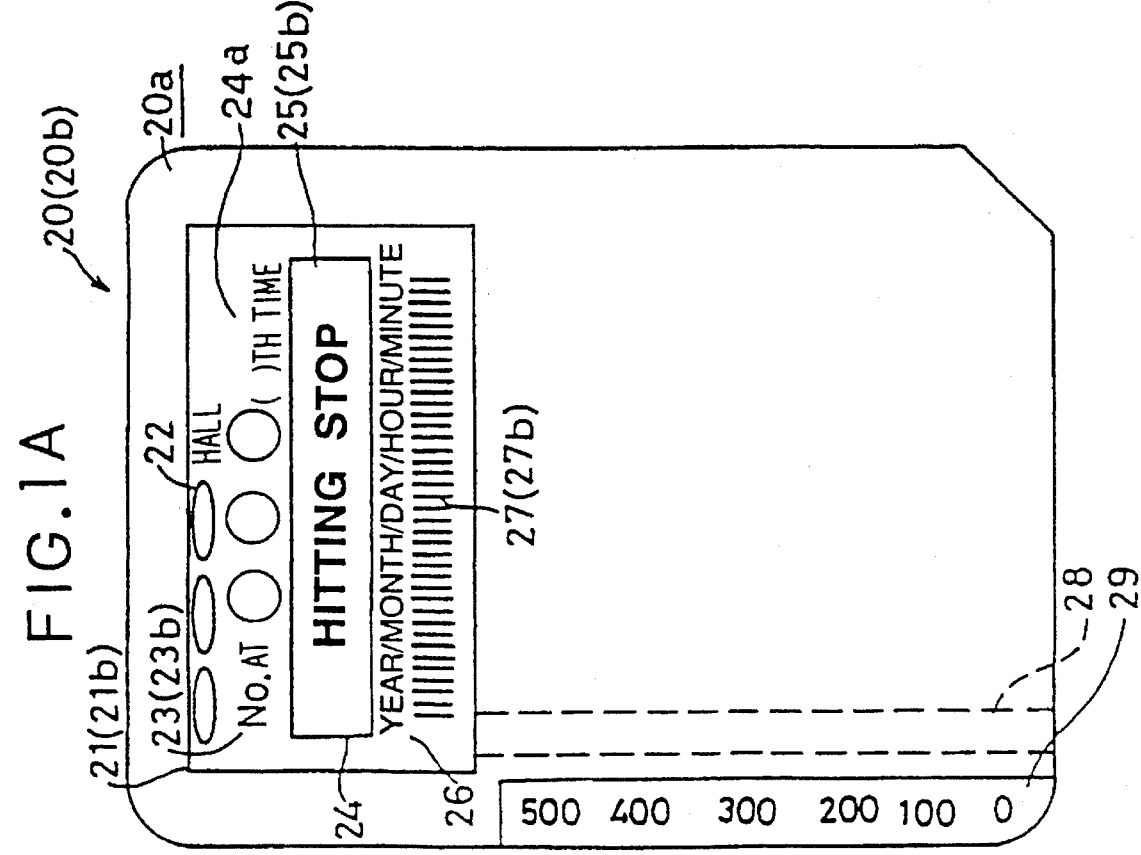

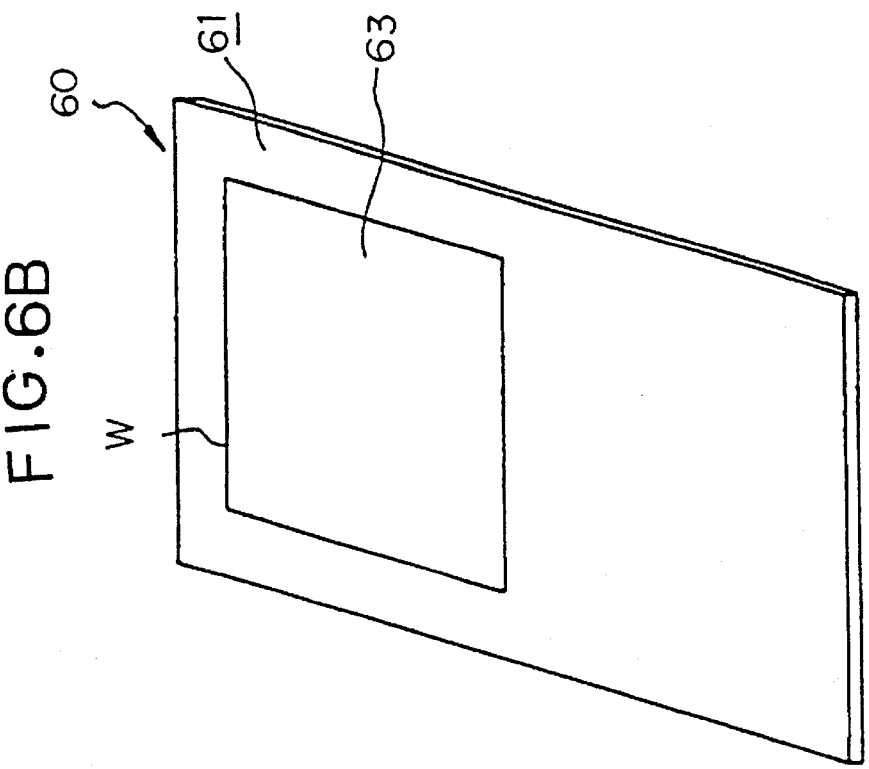
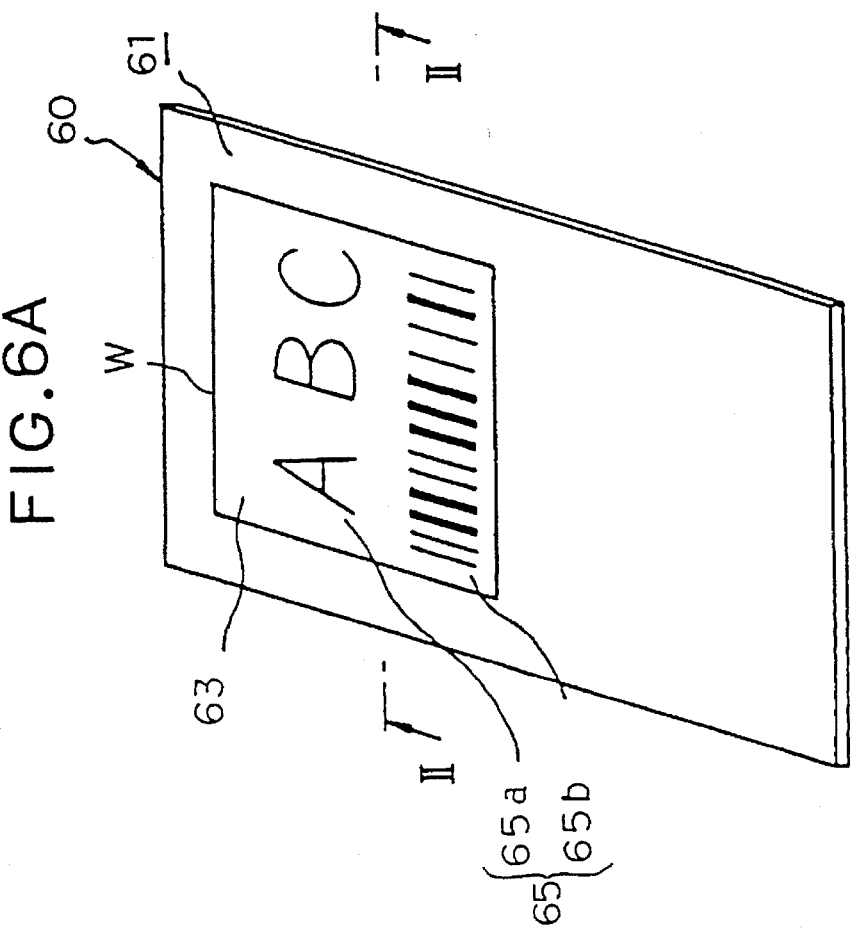

REPEATEDLY USABLE RECORDING MEDIUM CARD AND RECORDING MEDIUM CARD PROCESSOR

TECHNICAL FIELD

This invention relates to a recording medium card on which necessary items can be recorded and erased visually and a recording medium card processor which can record and erase necessary items on the recording medium card and in particular to a recording medium card used to record data such as game play records at gaming machines, etc., installed in a gaming house and a recording medium card processor which can record and erase necessary items on the recording medium card in response to a signal received from a central information processor which manages the gaming machines.

TECHNICAL BACKGROUND

A gaming house contains a large number of gaming machines whose conditions are continuously changing. The conditions of the gaming machines may contain information to be provided to personnel in the gaming house or players. For example, when an abnormal condition occurs on a gaming machine, information on the abnormal condition needs to be provided for personnel in the gaming house. Also, the player needs to be informed of the game play result at a gaming machine. Thus, in the gaming house, communication between the gaming machines and people is required. Particularly, it is necessary to transfer various pieces of information from the gaming machines to people. Hitherto, for example, information has been provided as follows.

Personnel in the gaming house monitor the conditions of each of a large number of gaming machines and when an abnormal condition occurs, take necessary action. Thus, personnel in the gaming house need to be informed of conditions occurring on the gaming machines installed in the gaming house. Such conditions include occurrence of a hitting stop, a jackpot, an illegal act, etc., at the gaming machines, for example.

When a condition which must be informed to the personnel in the gaming house occurs, first the gaming machine where the condition occurs detects it and sends its detection signal to a central information processor which manages the gaming machines, etc. When receiving the signal, the central information processor sends the contents of the condition and information specifying the gaming machine to broadcasting facilities for broadcasting a message such that "stop number X hitting" in the gaming house and displaying necessary items such as "hitting stop" and "number" on a display unit for informing personnel in the gaming house.

However, such broadcasting and display provide only temporary information. Thus, if conditions such as a hitting stop occur at a number of gaming machines at the same time or consecutively, it is difficult for personnel in the gaming house to remember the conditions and the machine numbers. Therefore, personnel need to go to a counter where the gaming house is managed, make a note of the number of the machine being stopped hitting, etc., then again take action for the gaming machines where the conditions such as the hitting stop occurred while referring to the note. Thus, recognition of occurrence of abnormal conditions requires a lot of time and labor, and personnel in the gaming house cannot take prompt action.

On the other hand, information provided for players by the gaming machines includes the game play results. Hitherto, the game play result, such as the number of won game play media, has been recorded on thermosensible paper by a printer installed for each gaming machine, and given to the player for informing him or her of the result. Necessary items, such as digits indicating the number of won game play media, a bar code indicating the digits, a date, time of day, and the number of the gaming machine, are indicated on the receipt.

The player can receive the receipt and take it to an adjustment counter or office to exchange it for a prize (or cash) corresponding to the number of game play media indicated on the receipt.

However, the receipt on which the number of game play media is printed is made of normal paper, and characters, etc., are hard to erase once they have been printed on the paper. Thus, the receipts on which the number of game play media is printed are difficult to reuse and are wasteful of resources. The receipts, which are usually discarded, increase the amount of rubbish.

As described above, hitherto, information transfer to personnel in the gaming house, and that to players, have been executed by different means. This means that an information transfer system from machines to people is not yet established in the gaming house.

The present invention is intended to solve such problems by using recording media that can be used repeatedly.

Material allowing characters, etc., to be written and erased repeatedly as desired, by applying heat and ink erased upon irradiation with light of a specific wavelength, can be used for such a purpose.

By the way, recording media on which characters, etc., can be written and erased repeatedly as desired by applying heat or using special ink, will be gradually degraded by repeated write and erase operation, thus the number of times the recording medium can be used is limited to a given number. Therefore, a system considering the number of times a medium is used is required to repeat information transfer using such a material.

However, the number of times a necessary item has been written onto a card cannot be checked clearly although the use limit can be preset. Therefore, use of a card exceeding the use limit may cause a device handling the degrading card to be placed out of order.

DISCLOSURE OF INVENTION

It is therefore a first object of the invention to provide a repeatedly usable recording medium card on which necessary items can be recorded and erased visually and via which information can be transferred from gaming machines to personnel in a gaming house and from gaming machines to players and a recording medium card processor which can record and erase necessary items on the recording medium card.

It is a second object of the invention to provide a recording medium card which enables personnel in a gaming house to visually check the number of use times for keeping track of the cleaning period, replacement period, etc., of the card and a recording medium card processor which can rewrite the number of use times.

To these ends, according to one form of the invention, there is provided a recording medium card having a card substrate made of a flexible material like a card and a recording portion for visually recording necessary items in a part of the card substrate, characterized in that the recording portion has a reusable indication layer consisting essentially of an organic compound whose crystal aggregates upon application of heat in a first temperature zone and diffuses upon application of heat in a second temperature zone different from the first temperature zone, on which the necessary items can be visually recorded and erased upon application of heat, and in that an area for recording information indicating the number of card use times, equivalent to the number of times data has been recorded and erased on the indication layer, is formed in a part of the card substrate.

For example, the area for recording the information indicating the number of card use times can be provided in a part of the reusable indication layer for visually indicating the information.

The recording medium card can further include a magnetic recording layer in a part of the card substrate as an area for recording the information indicating the number of card use times. The magnetic recording layer has a storage capacity being capable of recording at least the information indicating the number of card use times.

The recording medium card can further include a number-of-use-times confirmation portion for visually indicating the number of card use times in a part of the card substrate as an area for recording the information indicating the number of card use times. For example, the number-of-use-times confirmation portion can take a structure where a hole is punched at a position indicating the number of times by digit.

The recording medium card can further include a colored layer provided between the card substrate and the reusable indication layer. Preferably, the colored layer has a color forming a strong contrast to a whity color.

According to another form of the invention, there is provided a recording medium card having a card substrate made of a flexible material like a card and a recording portion for visually recording necessary items in a part of the card substrate, characterized in that the recording portion has a reusable indication layer on which the necessary items can be visually written and erased in ink erased upon irradiation with light of a specific wavelength on a surface of the card substrate, and in that an area for recording information indicating the number of card use times, equivalent to the number of times data has been recorded and erased on the indication layer, is formed in a part of the card substrate.

According to a further form of the invention, there is provided a recording medium card having a card substrate made of a flexible material like a card and a recording portion for visually recording necessary items in a part of the card substrate, characterized in that the recording portion has:

a reusable indication layer consisting essentially of an organic compound whose crystal aggregates upon application of heat in a first temperature zone and diffuses upon application of heat In a second temperature zone different from the first temperature zone, on which the necessary items can be visually recorded and erased upon application of heat; and a colored layer provided between the card substrate and the reusable indication layer, the colored layer having a color forming a strong contrast to a whity color.

According to one form of the invention related to a card processor, there is provided a recording medium card processor for recording and erasing data on a recording medium card having a recording portion for visually recording data in a part of a card substrate, the recording medium card processor comprising:

means for taking in the recording medium card from the outside;

means for erasing contents recorded in the recording portion of the taken-in recording medium card;

means for visually recording new data in the recording portion whose contents are erased;

means for recording the number of card use times, equivalent to the number of times data has been erased and recorded in the recording portion, in a predetermined area of the card; and means for discharging the card, onto which the new data is written to the outside.

The means for recording the number of card use times can magnetically record the number of use times in a magnetic recording area of the card.

The means for recording the number of card use times can also visually record the number of card use times.

The data recording means can further record the number of card use times in a predetermined area of the recording portion.

The erasing means can heat the recording portion at a temperature in a predetermined temperature zone to erase the record contents.

The data recording means can heat the recording portion at a temperature in a temperature zone different from that in the erasing means, to record data.

The erasing means can also irradiate the recording portion with light of a predetermined wavelength for erasing data.

The recording portion can record data in ink erased upon irradiation with light of the predetermined wavelength by the erasing means. In this case, the recording portion includes a thermosensible ribbon having the ink.

Necessary items can be repeatedly recorded and erased visually on the reusable indication layer of the recording medium card, whereby the recording medium card can be repeatedly used as a retainable card for effective use of resources.

If the number of card use times, the number of times the necessary items have been recorded on the reusable indication layer of the recording medium card, can be indicated visually on the display layer, the user of the recording medium card can keep track of the number of times the recording medium card has been actually used, namely, the number of reuse times, and therefore can easily keep track of the cleaning period of the recording medium card or the replacement period of the card, required because of degradation.

On the other hand, if the recording medium card has the magnetic recording layer, the number of card use times, the number of times the necessary items have been recorded on the reusable indication layer, can be magnetically recorded on the magnetic recording layer. Further, if the recording medium card also has the number-of-use-times confirmation portion, the number of card use times recorded on the magnetic recording layer can be indicated visually in the number-of-use-times confirmation portion.

For example, such recording medium cards can be used as means for transferring various pieces of information to personnel in the gaming house.

BRIEF DESCRIPTION OF THE DRAWINGS

In the accompanying drawings:

FIGS. 1A and 1B are each a plan view showing a recording medium card according to a first embodiment of the invention;

FIGS. 6A and 6B are each a plan view showing a recording medium card according to a fifth embodiment of the invention.

BEST MODE FOR CARRYING OUT THE INVENTION

Figure 2:
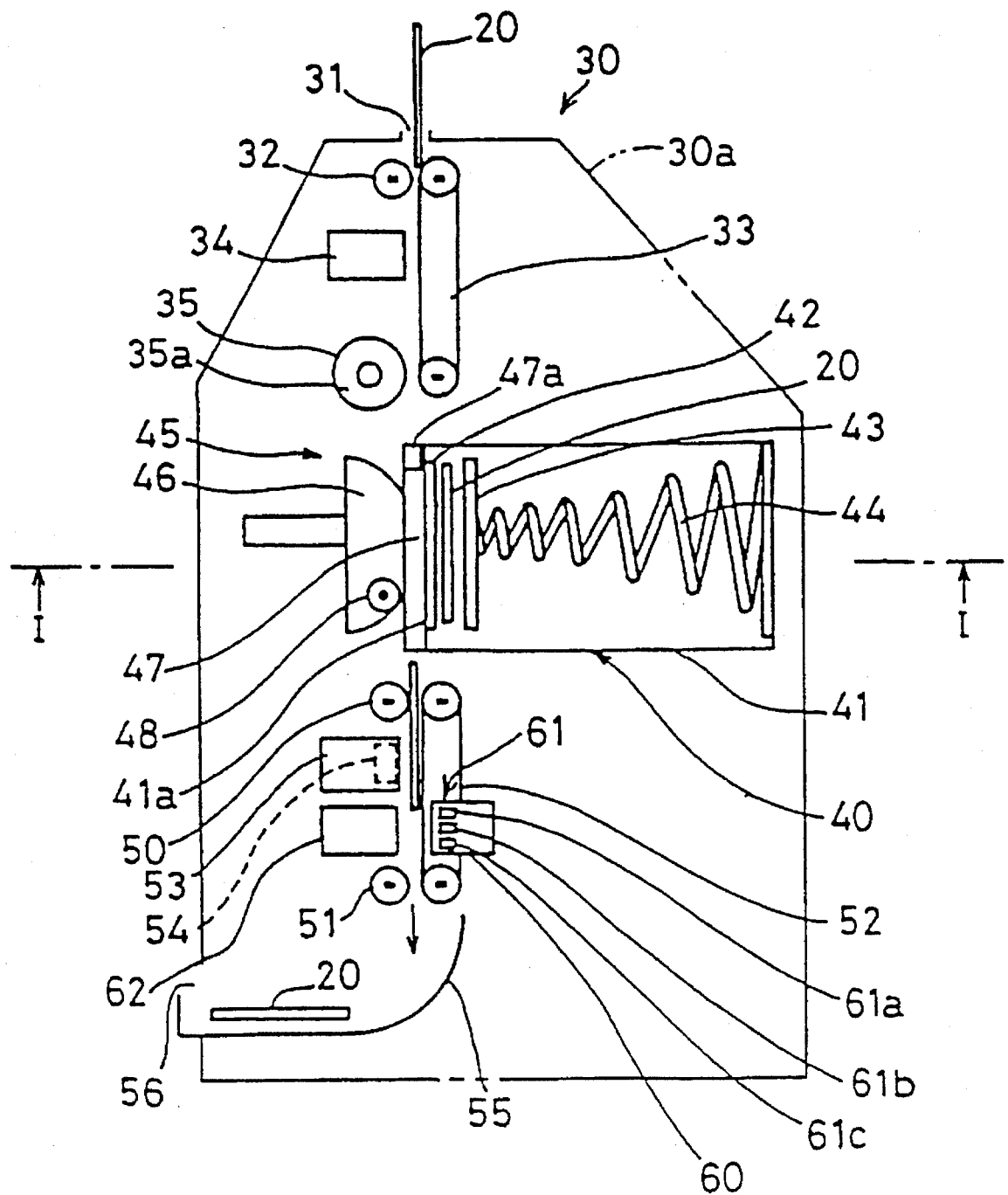
FIG. 2 is a schematic illustration showing the internal structure of a recording medium card according to a second embodiment of the invention.

Referring now to the accompanying drawings, there are shown embodiments of the invention.

FIGS. 1A and 1B show a recording medium card 20 according to a first embodiment of the invention. FIG. 1B shows a state in which no data is written onto the card; FIG. 1A shows a state in which information of occurrence of a hitting stop is written onto the card.

As shown in FIGS. 1A and 1B, a reusable indication layer 21, on which necessary items can be visually recorded and erased by applying heat, is formed on the surface of a plastic card substrate 20a for forming the recording medium card 20.

The reusable indication layer 21 consists essentially of an organic compound whose crystal aggregates to a visible state upon application of heat at a first specific temperature and diffuses to an invisible state upon application of heat at a second specific temperature in a temperature zone different from the first specific temperature. An organic compound as a specific example comprises a higher fatty acid such as a behenic acid, a lauric acid, or a stearic acid dispersed in a polymeric matrix material such as vinylidene chloride, to which a small amount of a surface active agent, etc., is added. PET (polyethylene terephthalate) resin may be used as a substrate of the organic compound.

Such a reusable indication layer 21 has the properties of being able to represent characters, digits, etc., visually upon application of heat at a predetermined temperature and making the characters, digits, etc., disappear upon application of heat at a temperature different from the predetermined temperature. The zone of the specific temperatures for erasure may be higher or lower than that of the specific temperatures for writing.

Necessary items such as an indication 22 of the name of a gaming house where the card is used, a condition indication 25 indicating the condition occurring at each pinball machine 11 (in the example, HITTING STOP) written within a frame line 24, a number indication 23 for specifying the pinball machine 11 at which the condition occurs, and a time indication 26 indicating the date and time of day when the condition occurs, are recorded on the reusable indication layer 21 of the recording medium card 20. A bar code indication 27 related to the number indication 23 and the condition indication 25 is recorded below the frame line 24. The gaming house name indication 22 and the frame line 24 are printed in normal ink which is difficult to erase.

The number of card use times 24a, the number of times the necessary items such as the number indication 23 have been recorded on the reusable indication layer 21, can be represented on the reusable indication layer 21 of the recording medium card 20 in visible characters, digits, etc., by applying heat at a predetermined temperature.

A magnetic recording layer 28 extending like a stripe in parallel with a long side of the card substrate 20a is formed on the rear of the card substrate 20a. For example, the magnetic recording layer 28 comprises a magnetic powder material such as a ferric oxide uniformly tempered and put on a polyester film, etc. The magnetic recording layer 28 is a layer on which the number of card use times, the number of times the necessary items such as the condition indication 25 have been recorded on the reusable indication layer 21, can be recorded magnetically.

On the rear of the card substrate 20a, a number-of-use-times confirmation section 29, where use times recorded on the magnetic recording layer 28 is indicated with punch holes, is formed on an end margin along the long side of the card substrate 20a.

Next, the operation of the recording medium card 20 according to the first embodiment will be described.

As shown in FIG. 1, necessary items can be repeatedly recorded and erased visually on the reusable indication layer 21 of the recording medium card 20, whereby the recording medium card 20 can be repeatedly used as a retainable card for effective use of resources.

On the other hand, the number of card use times, the number of times the necessary items have been recorded on the reusable indication layer 21, can be recorded magnetically on the magnetic recording layer 28 of the recording medium card 20. The number of card use times recorded on the magnetic recording layer 28 can be indicated visually in the number-of-use-times confirmation section 29 of the recording medium card 20. Thus, the user of the recording medium card 20 can clearly keep track of the number of times the recording medium card 20 has been used, to easily keep track of the cleaning period of the recording medium card 20 or the replacement period of the card 20, which are a result of degradation.

Figure 7:
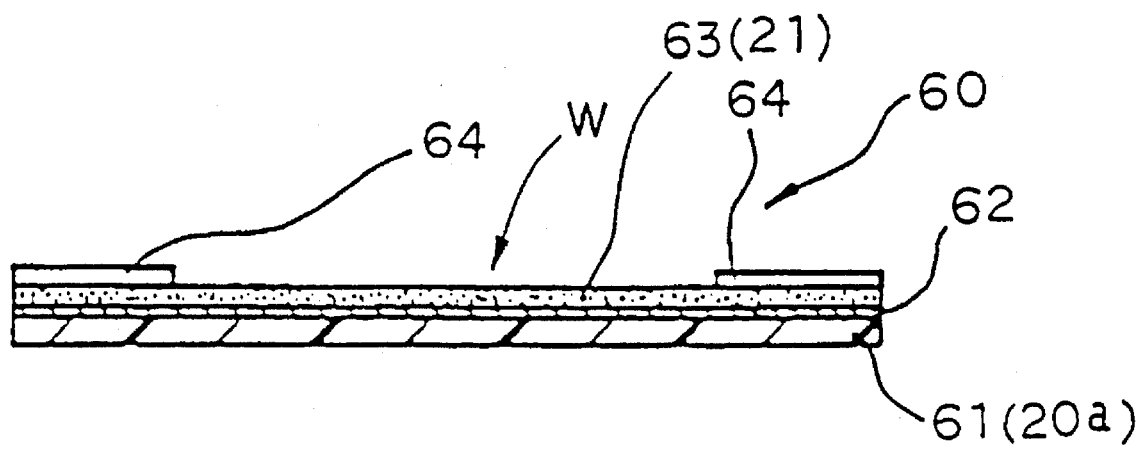
FIG. 7 is a sectional view taken on line II—II of FIG. 6A.

The card of the embodiment can have a sectional structure, for example, as shown in FIG. 7 discussed below. That is, a colored layer 62 is placed on the card substrate 20a and the reusable indication layer 21 is placed on the colored layer 62. See the description of the fifth embodiment for details of the structure.

FIG. 2 shows a recording medium card processor 30 according to a second embodiment of the invention.

Figure 3:
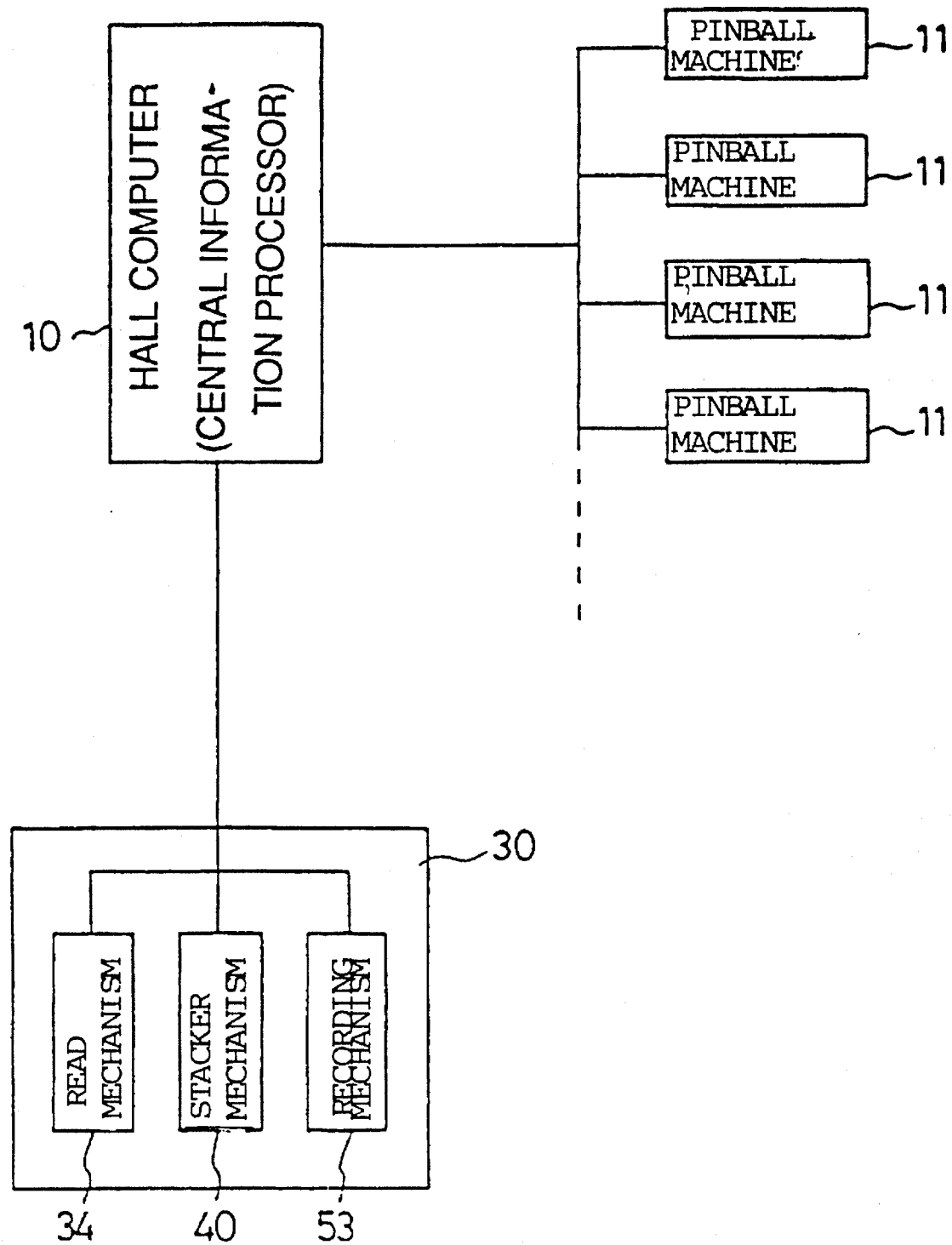
FIG. 3 is an outlined block diagram showing the relationships between a recording medium card processor according to a second embodiment of the invention, a central information processor, and a plurality of gaming machines.

As shown in FIG. 3, the recording medium card processor 30 is used in a gaming house containing a plurality of pinball machines 11, 11 . . . , which are gaming machines. That is, the recording medium card processor 30 is connected to a hall computer 10, a central information processor which manages the gaming machines 11, and when receiving a signal from the computer 10, the recording medium card processor 30 writes necessary items onto a recording medium card 20 and informs personnel in the gaming house that a condition such as a hitting stop or fever has occurred.

As shown in FIG. 2, the recording medium card processor 30 comprises card feeders 33 and 52 for transporting a recording medium card 20 along a transport passage connecting an insertion slot 31 and a dispensing slot 56, a read mechanism 34, an erasing mechanism 35, a stacker mechanism 40, a necessary item recording mechanism 53, a number-of-use-times recording mechanism 60, and a punch mechanism (indication mechanism) 62 installed along the transport passage.

As shown in FIG. 3, the read mechanism 34 and the necessary item recording mechanism 53 are connected to the hall computer 10 which executes centralized management of the pinball machines 11 so that signals can be transferred therebetween.

As shown in FIG. 2, the insertion slot 31 for taking in a recording medium card 20 is opened on the top of a case body 30*a* of the recording medium card processor 30. On the other hand, the dispensing slot 56 for ejecting the recording medium card 20 is formed on the front of the bottom of the case body 30*a*. The transport passage of the recording medium card 20 from the insertion slot 31 to the dispensing slot 56 is formed inside the case body 30*a*.

The first card feeder 33 is installed at the starting end of the transport passage near the insertion slot 31 for transporting the recording medium card 20 entered in the insertion slot 31 to a standby chamber 47 of the stacker mechanism 40. The first card feeder 33 consists of an endless belt placed on top and bottom pulleys. Also, a first press pulley 32 is installed facing the top pulley.

The read mechanism 34 is installed along the vicinity of the center of the first card feeder 33 for optically reading a bar code indication 27 recorded on the recording medium card 20 transported and signaling the contents and the read time to the hall computer 10. The bar-code reader for optically reading bar codes and the signaling device are general and will not be discussed. The read time may be recorded in the hall computer 10.

The erasing mechanism 35 has a heating drum 35*a*, a heating element, and is disposed facing the bottom pulley of the first card feeder 33. The heating drum 35*a* is adapted to apply heat of a predetermined temperature to a reusable indication layer 21 of the recording medium card 20 after read through the read mechanism 34 for erasing necessary items such as a number indication 23 and a condition indication 25 written onto the recording medium card 20.

The heating drum 35*a* is mounted for rotation and is disposed so as to feed the recording medium card 20 to the standby chamber 47 of the stacker mechanism 40 in cooperation with the first card feeder 33. The heating element may be made of a thermal head and its heating temperature may be set to an erasing temperature for erasing necessary items by passing the card through the side of the heating element.

The stacker mechanism 40 has the standby chamber 47 for taking in recording medium cards 20 one at a time at the beginning, a housing box 41 for stacking a plurality of recording medium cards 20, 20 . . . , and a card storage mechanism 45 for storing the recording medium cards 20 in the housing box 41 from the standby chamber 47 and discharging the recording medium cards in the housing box 41 one at a time.

Figure 4:
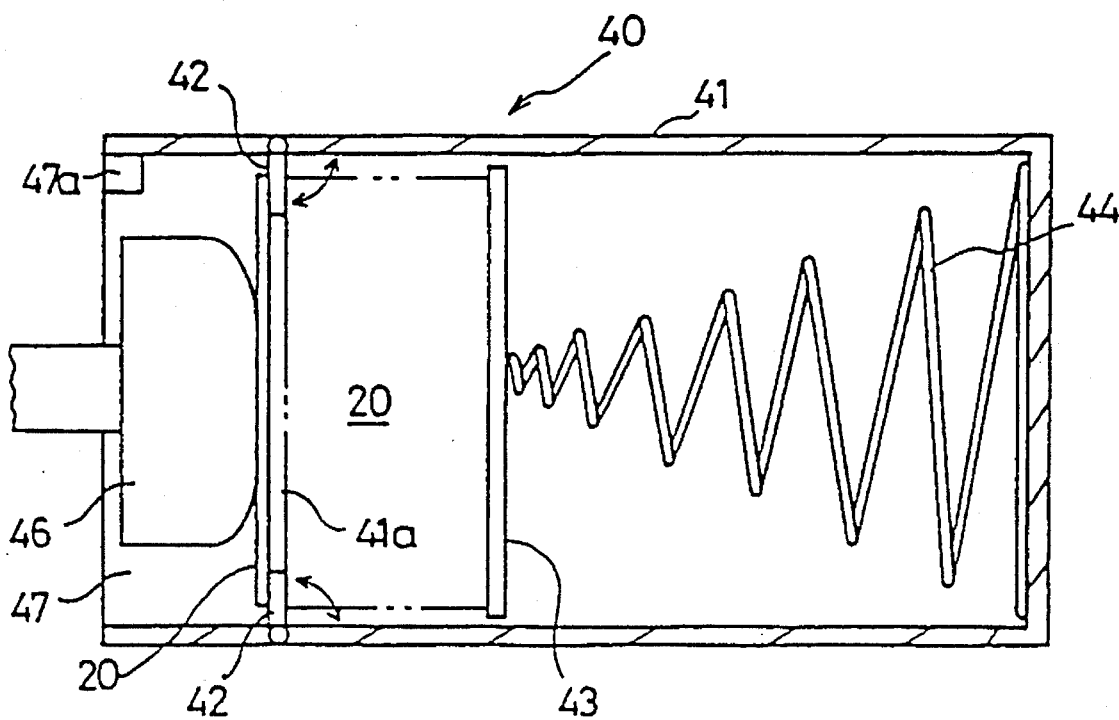
FIG. 4 is a sectional view taken on line IV—IV of FIG. 2.

More particularly, as shown in FIG. 4, the standby chamber 47 has one side open along the transport passage and the other side communicated with an entrance and exit 41*a* of the housing box 41. A pair of shutter members 42 and 42 that can be opened and closed are provided on both side ends of the entrance and exit 41*a*. Each shutter member 42 is located so that it can rock between an open position in the inner direction and a closed position so as to extend at right angles to the side wall of the housing box 41. The shutter members 42 and 42 are usually urged into the closed position by springs (not shown).

The housing box 41 contains a card reception plate 43 in contact with a recording medium card 20. The card reception plate 43 is urged by a coil spring 44 in a direction approaching the entrance and exit 41*a*. The card reception plate 43, together with the shutter members 42 and 42 at the closed positions, holds a bundle of recording medium cards 20 in the housing box 41 therebetween.

The card storage mechanism 45 comprises a sensor section 47*a*, a drive piston 46, and a transport roller 48. The sensor section 47*a* is attached to the upper end of the side wall of the standby chamber 47 for sensing the presence or absence of a recording medium card 20 sent to the entrance and exit 41*a* positioned in the standby chamber 47 and outputting a sensing signal to a drive (not shown) for driving the drive piston 46.

The drive piston 46 can telescope between a push position, entering the inside of the housing box 41 while pushing and opening the shutter members 42 and 42 from the entrance and exit 41*a* based on the signal from the sensing section 47*a*, and a feed position, coming into contact with the outermost recording medium card 20 appearing between the shutter members 42 and 42 at both ends of the entrance and exit 41*a* based on a signal from the hall computer 10.

The transport roller 48 for feeding the recording medium card 20 to the necessary item recording mechanism 53 from the bottom of the shutter members 42 and 42 at both sides when the drive piston 46 is at the feed position is attached to the tip of the drive piston 46. The transport roller 48 rotates and drives the recording medium card 20 in a transport direction in response to a signal from the hall computer 10.

The second card feeder 52 is installed along the transport passage downstream from the stacker mechanism 40 for transporting the recording medium card 20 fed from the stacker mechanism 40 to a guide member 55 at the termination of the transport passage. The second card feeder 52 consists of an endless belt placed on top and bottom pulleys. A second press pulley 50 and a third press pulley 51 are installed near the top and bottom pulleys so as to face them.

The necessary item recording mechanism 53 is installed along the transport passage between the second press pulley 50 and the third press pulley 51 for newly writing necessary items such as a number indication 23 and a condition indication 25 onto the recording medium card 20 being transported, based on a signal from the hall computer 10. More particularly, the necessary item recording mechanism 53 has a thermal head 54 for writing characters, etc., visually, and heating means (not shown) for heating the thermal head 54 to a predetermined temperature.

The number-of-use-times recording mechanism 60 is installed along the transport passage, between the second press pulley 50 and the third press pulley 51, downstream from the necessary item recording mechanism 53. The number-of-use-times recording mechanism 60 has a magnetic head assembly 61 (simply, a magnetic head) consisting of a read head 61*a*, an erase head 61*b*, and a write head 61*c*. The magnetic head assembly 61 (61*a*, 61*b*, 61*c*) magnetically reads the number of card use times, the number of times the necessary item recording mechanism 53 has recorded necessary items on the reusable indication layer 21 of the recording medium card 20, from the magnetic recording layer 28 of the recording medium card 20, erases the record contents of the magnetic recording layer 28, and writes new data onto the magnetic recording layer 28, in that order. The configuration of the magnetic head 61 is general and will not be discussed.

The punch mechanism 62 for forming the indication mechanism is disposed facing the number-of-use-times recording mechanism 60 with the transport passage between. The punch mechanism 62 is a mechanism for punching a small hole at a predetermined position (where digits indicating the number of card use times are previously printed) in the number-of-use-times confirmation section 29 of the recording medium card 20 based on a signal from the number-of-use-times recording mechanism 60 so that people can visually check the number of card use times recorded on the magnetic recording layer 28 in predetermined units. The guide member 55 for guiding the recording medium card 20 to the dispensing slot 56 open in the lower part on the front of the case body 30a is installed below the termination of the second card feeder 52.

Next, the function of the recording medium card processor 30 according to the second embodiment will be described.

As shown in FIGS. 2 and 3, when detecting a condition such as a hitting stop, jackpot, or illegal act at each pinball machine 11, the hall computer 10, the central information processor which executes centralized management of a plurality of pinball machines 11, 11 . . . outputs a signal corresponding to the condition to the stacker mechanism 40 and the necessary item recording mechanism 53 of the recording medium card processor 30.

When receiving the signal from the hall computer 10, the stacker mechanism 40 feeds one recording medium card 20 at a time to the necessary item recording mechanism 53 based on the signal. The recording medium card 20 may be preset in the necessary item recording mechanism 53. The stacker mechanism 40 stores a plurality of recording medium cards 20 in the housing box 41.

More particularly, when the card storage mechanism 45 receives the signal from the hall computer 10, the drive piston 46, one component of the card storage mechanism 45, is displaced to the feed position in contact with the outermost recording medium card 20 in the housing box 41 appearing between the shutter members 42 and 42 at both sides of the entrance and exit 41a. Subsequently, the transport roller 48 at the tip of the drive piston 46 rotates to discharge the recording medium card 20 from the housing box 41. Further, the recording medium card 20 is fed to the side of the necessary item recording mechanism 53 by the second card feeder 52.

The necessary item recording mechanism 53 writes new necessary items onto the reusable indication layer 21 of the recording medium card 20. For example, when a signal of "hitting stop at number X" is received from the hall computer 10, the necessary item recording mechanism 53 writes the necessary items of the number indication 23 specifying the pinball machine 11 at which the hitting stop occurs, the condition indication 25 indicating the occurring condition of "hitting stop," and the time indication 26 indicating the date and time of day when the condition occurred onto the recording medium card 20 so that personnel in the gaming house can check the contents at a glance, as shown in FIG. 1A. Further, the bar code indication 27 related to the number indication 23 and the condition indication 25 is also written.

That is, dot elements of the thermal head 54 of the necessary item recording mechanism 53 are heated to a predetermined temperature by the heating means (not shown) and heat of the predetermined temperature is applied to the surface of the reusable indication layer 21 of the recording medium card 20, thereby writing digits, characters, etc., representing the number indication 23, etc., visually onto the surface of the reusable indication layer 21.

The number-of-use-times recording mechanism 60 downstream from the necessary item recording mechanism 53 magnetically records the number of card use times of the recording medium card 20 on the magnetic recording layer 28 of the magnetic medium card 20. Further, the punch mechanism 62 punches the number-of-use-times confirmation section 29 of the recording medium card 20 to make a hole which clearly indicates the number of card use times recorded on the magnetic recording layer 28 of the recording medium card 20.

The recording medium card 20 thus processed is transported downstream by the second card feeder 52 and is discharged via the guide member 55 through the dispensing slot 56 to the outside. Thus, personnel in the gaming house can receive the recording medium card 20 on which the necessary items are written through the dispensing slot 56 of the recording medium card processor 30. Then, in accordance with the information of the recording medium card 20, personnel in the gaming house can take proper action for the pinball machine 11 where the condition such as a hitting stop occurs.

Thus, if a condition such as a hitting stop occurs at a number of pinball machines 11 at the same time or consecutively, personnel in the gaming house can use the recording medium cards 20 received from the recording medium card processor 30 to take reliable and prompt action for the pinball machines 11, as compared with the conventional method in which personnel in the gaming house remember temporary broadcasting or display on the CRT informing them that the conditions occur, or go to the counter to make a note before taking action for the pinball machines 11.

After taking action for the pinball machine, personnel in the gaming house enter the used recording medium card 20 in the insertion slot 31 of the recording medium card processor 30 so as to insert the card 20 into the processor 30. That is, the recording medium card 20 entered in the insertion slot 31 is transported on the transport passage by the first card feeder 33 and the contents are read by the read mechanism 34. The read mechanism 34 transmits a signal of the contents read from the recording medium card 20 and the read time to the hall computer 10.

The hall computer 10 controls various data provided by the signal from the read mechanism 34, whereby data can be set so as to indicate the time between a hitting stop or any other abnormal condition occurring and personnel taking action can use it as an index to judge a response in the gaming house.

Next, the recording medium card 20 from which the necessary items are read by the read mechanism 34 is transported on the transport passage and the record of the necessary items is erased by the heating drum 35a of the erasing mechanism 35. That is, heat at a predetermined temperature is applied to the recording medium card 20 by the heating drum 35a, whereby the characters, digits, etc., written on the recording medium card 20 are made to disappear. The recording medium card 20 is again heated by the necessary item recording mechanism 53, so that the card 20 can be used repeatedly.

The recording medium card 20 from which the record of the necessary items is erased as shown in FIG. 1B is transported to the stacker mechanism 40 and stands by in the standby chamber 47 of the stacker mechanism 40. At this time, the sensor section 47a of the card storage mechanism 45 senses that the recording medium card 20 has been fed into the standby chamber, and sends a sensing signal to the drive piston 46.

Then, as shown in FIG. 4, the drive piston 46 of the card storage mechanism 45 expands to the push position and pushes and opens the shutter members 42 and 42 of the entrance and exit 41a for pushing the recording medium card 20 in the standby chamber 47 into the housing box 41.

A bundle of recording medium cards 20 in the housing box 41 are sandwiched between the card reception plate 43 and the shutter members 42 and 42 so that they are held. The stored recording medium cards 20 are ejected from the lower part of the shutter members 42 and 42 on both sides to the necessary item recording mechanism 53, in sequence, by the transport roller 48, in response to a signal from the hall computer 10, as described above.

Next, a recording medium card according to a third embodiment of the invention will be described.

The card of the third embodiment has an appearance similar to that shown in FIGS. 1A and 1B and therefore will be discussed with reference to FIG. 1.

The recording medium card 20b according to the embodiment comprises a reusable indication layer 21b onto which necessary items are written for visible recording in predetermined ink erased upon irradiation with predetermined light, as shown in FIG. 1.

Necessary items such as a condition indication 25b indicating the condition occurring at each pinball machine 11 shown in FIG. 3 (in the example, HITTING STOP), a number indication 23b for specifying the pinball machine 11 at which the condition occurs, and a bar code indication 27b related to the number indication 23b and the condition indication 25b are written and recorded on the recording medium card 20b in the predetermined ink, as shown in FIG. 1A.

The predetermined ink is not affected by visible light of wavelength of 400–700 nanometers rays, but is erased in a short time upon irradiation with light of 820 nanometers from a halogen lamp or the like. Parts identical with or similar to those previously described in the first embodiment are denoted by the same reference numerals in the third embodiment and will not be discussed again.

Figure 5:
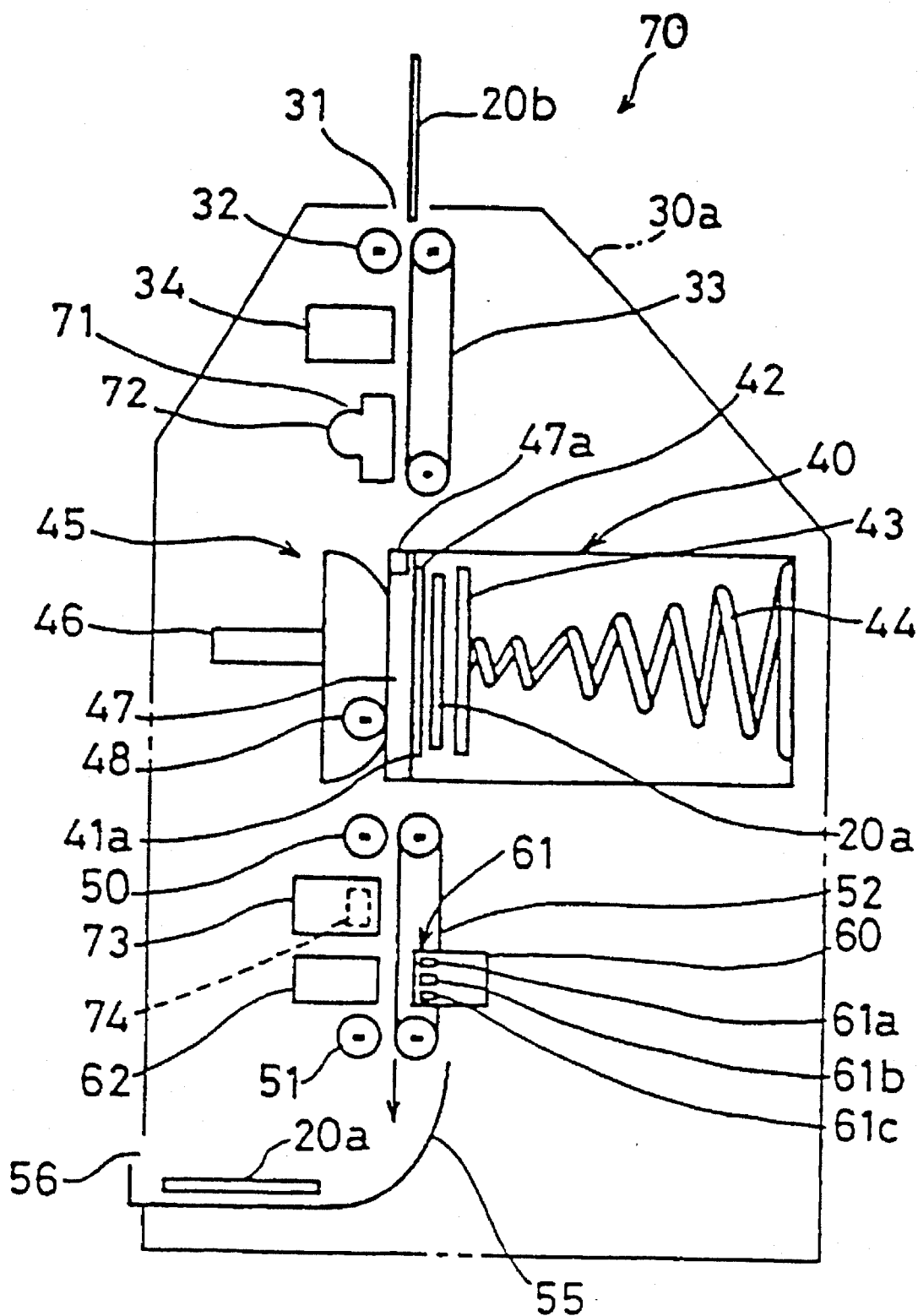
FIG. 5 is a schematic illustration showing the internal structure of a recording medium card according to a fourth embodiment of the invention.

FIG. 5 shows a recording medium card processor 70 according to a fourth embodiment of the invention. The embodiment performs recording, erasing, and writing for the recording medium card of the third embodiment.

The recording medium card processor 70 according to the embodiment has a read mechanism 34, an erase mechanism 71, a stacker mechanism 40, a necessary item recording mechanism 73, a number-of-use-times recording mechanism 60, and a punch mechanism 62, as shown in FIG. 5.

The erase mechanism 71 consists of a halogen lamp 72 for irradiating the predetermined ink with the predetermined light for erasing the ink. The necessary item recording mechanism 73 has a thermosensible tape cassette (not shown) made of the predetermined ink and a thermal head 74 for writing necessary items onto a transported recording medium card 20b. Parts identical with or similar to those previously described in the second embodiment are denoted by the same reference numerals in the fourth embodiment and will not be discussed again.

When receiving a signal from a hall computer 10, the recording medium card processor 70 according to the fourth embodiment prints necessary items, such as the number indication 22b and the condition indication 25b, on the transported recording medium card 20b in ink erased upon irradiation with light of the predetermined wavelength, by using the thermosensible tape cassette and the thermal head 74.

If the recording medium card 20b, after being processed by personnel in the gaming house, is irradiated with light of the predetermined wavelength from the halogen lamp 72, the recorded necessary items are made to disappear. Therefore, necessary items can be repeatedly recorded in the erasable ink until the recording medium card 20b itself degrades.

An example of a system in which characters, symbols, etc., are written and erased by application of heat is given in the second embodiment; as another system, the full face of a card is filled in or the card is filled in with necessary portions, and characters and symbols can be written at the erase temperature and filled in at the write temperature for effective erasing.

According to the recording medium card of the invention, necessary items can be visually recorded and erased on the reusable indication layer and the number of card use times can be visually indicated on the reusable indication layer itself. Also, the number of card use times can be recorded on the magnetic recording layer and be visually indicated in the number-of-use-times confirmation section. Thus, the card can be used repeatedly and the number of card use times can be visually checked clearly, for easily ascertaining the cleaning period, replacement period, etc., of the recording medium card.

Also, the recording medium card processor according to the invention can record and erase necessary items on a recording medium card and indicate the number of card use times the necessary items have been recorded on the recording medium card, based on a signal from the central information processor which manages the gaming machines. Thus, when a condition such as a hitting stop occurs at a gaming machine in the gaming house, personnel in the gaming house can take prompt action and the recording medium cards can be used repeatedly for conservation of resources and reducing the generation of rubbish.

Next, a fifth embodiment of the invention will be described with reference to the accompanying drawings.

FIGS. 6 and 7 show a recording medium card 10 according to the fifth embodiment of the invention.

As shown in FIG. 7, the recording medium card 60 has a plastic card substrate 61 like a sheet, a colored layer 62 formed on the card substrate 61, a reusable indication layer 63 formed on the colored layer 62, and a surface print layer 64 formed on the reusable indication layer 63.

As shown in FIGS. 6A and 6B, the recording medium card 60 comprises a window W, a rectangular block surrounded by the surface print layer 64 in the upper half portion of the card substrate 61. The reusable indication layer 63 appears in the window W. When at least a part of the reusable indication layer 63 is in an invisible state, the colored layer 62 under the reusable indication layer 63 appears via the invisible portion.

The colored layer 62 is colored in a color forming a remarkable contrast to white, for example, black. In addition to coloring, a color film, aluminum film, or the like may be attached to form the colored layer 62.

The reusable indication layer 63 consists of an organic compound whose crystal aggregates to be whity opaque upon application of heat at a first specific temperature and diffuses to form an invisible portion upon application of heat at a second specific temperature different from the first specific temperature. The reusable indication layer 63 is, for example, an organic compound comprising a higher fatty acid such as a behenic acid, a lauric acid, or a stearic acid dispersed in a polymeric matrix material such as vinylidene chloride to which a small amount of a surface active agent, etc., is added. PET (polyethylene terephthalate) resin may be used as a sheet-like support of the organic compound.

If heat is applied to the reusable indication layer 63 at the first specific temperature (100° C. or higher), particles of the organic compound change to be polycrystalline for generating irregular reflection, thus the reusable indication layer 63 becomes whity opaque and visible. If the indication layer 63 is heated at the second specific temperature (70°–95° C.), the crystal becomes monocrystalline and diffuses, making the indication layer 63 invisible.

In the embodiment, the reusable indication layer 63 is used in a state after the full face is heated at the first specific temperature, that is, in a state in which the reusable indication layer 63 is made whity opaque as a whole and appears as if it were normal white paper. If heat is applied only to necessary items 65 such as characters 65a and a bar code 65b to be recorded on the reusable indication layer 63, only the heated portion is made invisible and the colored layer 62 under the portion appears, thus the reusable indication layer 63 can be represented as if the necessary items 15 were written in a color such as black forming a sharp contrast to the white background.

The surface print layer 64 is formed in the lower half portion of the card substrate 61 and surrounds the reusable indication layer 63, as shown in FIG. 6A. The surface print layer 64 is formed in solid white. Characters or graphic patterns may be written, or the layer 64 may be colored.

Next, the function of the embodiment will be discussed.

The organic compound forming the reusable indication layer 63 of the recording medium card 60 is previously heated at a specific temperature (100° C. or higher), whereby crystal aggregates, causing light to be irregularly reflected, thus making the reusable indication layer 63 whity opaque as shown in FIG. 6B. In the normal use state, the reusable indication layer 63 appears as if it were white paper, which the user is familiar with.

If the reusable indication layer 63 is heated at another specific temperature (70°–95° C.), the crystal in the heated portion diffuses to form an invisible portion, thus the colored layer 62 (in a color forming a remarkable contrast to white, such as black) of the sheet-like support under the reusable indication layer 63 appears only in the heated portion.

Therefore, as shown in FIG. 6A, if heat is applied only to the necessary items 65 such as characters 65a and a bar code 65b to be recorded on the reusable indication layer 63, only the heated portion is made invisible and the colored layer 62 under the portion appears. Thus, the necessary items 65 can be represented as if they were written in a color such as black forming a sharp contrast to the white background.

On the other hand, if the reusable indication layer 63 including the portion in which the necessary items 65 such as the written characters 65a and a bar code 65b are represented, is again heated at the specific temperature (100° C. or higher), the crystal in the invisible portion is again made whity opaque, thus the necessary items 65 such as the characters 65a disappear.

Therefore, if the recording medium card 60 itself is not damaged, the necessary items 65 such as the characters 65a can be repeatedly written or erased by heating the reusable indication layer 63 at the specific temperature or a different specific temperature.

Thus, the recording medium card 60 can be used repeatedly without making the user feel a physical disorder in the same image as general white cards and effective use is made of resources.

In the above-mentioned embodiment, only a part on the surface of the sheet-like support is colored in a color forming a remarkable contrast to white, and the recycle indication layer is laminated on that part, but the reusable indication layer may be laminated on the full surface of the sheet-like support.

Thus, according to the recording medium card of the embodiment, the necessary items can be visually represented on the reusable indication layer which is normally white as a whole and where data can be written and erased repeatedly upon application of heat as if they were written in a color forming a remarkable contrast to white. Therefore, the recording medium card can be used repeatedly, and look like ordinary white cards, which do not make the user feel apprehensive in any way.

What is claimed is:

1. A gaming house system comprising a plurality of gaming machines, a computer for managing the gaming machines, a plurality of recording medium cards for recording output information from the gaming machines, and a recording medium card processor being connected to the computer for managing the recording medium cards for repetitive use of the cards, characterized in that each of said recording medium cards has:
a card substrate made of a flexible material, a data recording portion for visually recording necessary items on a part of the card substrate, and a number-of-use-times recording portion for recording information indicating the number of card use times, equivalent to the number of times data has been recorded and erased in the data recording portion, on another part of the card substrate, and in that said recording medium card processor comprises:
means for taking in the recording medium card from outside;
means for erasing contents recorded in the data recording portion of the taken-in recording medium card;
a stacker mechanism for taking in the recording medium card from said erasing means and temporarily storing the card;
means for visually recording new data sent from said computer in the data recording portion of the card taken out from said stacker mechanism;
means for reading the number of card use times from the number-of-use-times recording portion and recording a new number of card use times in the number-of-use-times recording portion; and
means for discharging the card, onto which the new data is written, to the outside.

2. The gaming house system as claimed in claim 1 wherein said number-of-use-times recording portion has a magnetic recording area and a visible recording area, and wherein
said number-of-card-use-times recording means magnetically records the number of use times in said magnetic recording area and visually records the number of card use times in said visible recording area.

3. The gaming house system as claimed in claim 2 wherein said number-of-card-use-times recording means has a punch mechanism for punching to visually record the number of card use times in a recording area.

4. The gaming house system as claimed in claim 2 further including read means placed between said taking-in means and said erasing means for reading contents of the data recording portion, wherein information read by said read means is sent to said computer.

5. The gaming house system as claimed in claim 2 wherein said visible recording area has a reusable indication layer consisting essentially of an organic compound whose crystal aggregates upon application of heat in a first temperature zone and diffuses upon application of heat in a second temperature zone different from the first temperature zone, on which the necessary items can be visually recorded and erased upon application of heat.

6. The gaming house system as claimed in claim 2 wherein said data recording portion and said visible recording area comprise a reusable indication layer provided in common, said indication layer consisting essentially of an organic compound whose crystal aggregates upon application of heat in a first temperature zone and diffuses upon application of heat in a second temperature zone different from the first temperature zone, on which the necessary items can be visually recorded and erased upon application of heat.

7. The gaming house system as claimed in claim 6 wherein when a predetermined specific condition for a gaming machine occurs, information indicating the specific condition is recorded visually in said data recording portion.

8. The gaming house system as claimed in claim 1 wherein said data recording portion has a reusable indication layer consisting essentially of an organic compound whose crystal aggregates upon application of heat in a first temperature zone and diffuses upon application of heat in a second temperature zone different from the first temperature zone, on which the necessary items can be visually recorded and erased upon application of heat.

9. The gaming house system as claimed in claim 1 wherein when a predetermined specific condition for a gaming machine occurs, information indicating the specific condition is recorded visually in said data recording portion.

10. The gaming house system as claimed in claim 9 wherein the gaming machine is a pinball machine, and wherein
the information indicating the specific condition of the gaming machine contains at least information indicating occurrence of a hitting stop of the pinball machine.

* * * * *